(12) United States Patent
Smith et al.

(10) Patent No.: US 8,560,027 B2
(45) Date of Patent: Oct. 15, 2013

(54) MULTI-SCREEN PERSONAL COMMUNICATION DEVICE

(75) Inventors: Eldrege Smith, New York, NY (US); Steve Myrhil, Brooklyn, NY (US)

(73) Assignee: Skeyedex Inc., New York, NY (US)

( * ) Notice: Subject to any disclaimer, the term of this patent is extended or adjusted under 35 U.S.C. 154(b) by 328 days.

(21) Appl. No.: 12/930,969

(22) Filed: Jan. 21, 2011

(65) Prior Publication Data

US 2012/0001831 A1    Jan. 5, 2012

Related U.S. Application Data

(60) Provisional application No. 61/398,696, filed on Jun. 30, 2010.

(51) Int. Cl.
*H04M 1/00*    (2006.01)

(52) U.S. Cl.
USPC ............... 455/575.1; 455/566; 455/556.1; 345/173; 361/679.01

(58) Field of Classification Search
USPC ............... 455/575.1, 566, 556.1; 361/679.01; 345/173
See application file for complete search history.

(56) References Cited

U.S. PATENT DOCUMENTS

| | | | | |
|---|---|---|---|---|
| 2003/0218860 | A1* | 11/2003 | Shiraiwa | 361/681 |
| 2004/0266477 | A1* | 12/2004 | Murata | 455/556.1 |
| 2010/0295802 | A1* | 11/2010 | Lee | 345/173 |
| 2010/0298033 | A1* | 11/2010 | Lee | 455/566 |
| 2010/0328860 | A1* | 12/2010 | Kim et al. | 361/679.01 |

* cited by examiner

*Primary Examiner* — Danh Le
(74) *Attorney, Agent, or Firm* — Gotham Patent Services; James P. Demers

(57) ABSTRACT

The invention is a portable communication device having a primary display screen and one or more auxiliary display screens, which may be folded into the body of the device when not required by the user so as to retain the convenient size expected of a hand-held device. The screens are rotatably attached to the body of the device in a manner that does not obscure the primary display screen, so that the user need not deploy them unless needed.

20 Claims, 17 Drawing Sheets

MULTI-SCREEN PERSONAL COMMUNICATION DEVICE

PRIOR APPLICATION

This application claims priority of U.S. Provisional Application No. 61/398,696, filed Jun. 30, 2010, which is incorporated herein by reference in its entirety.

FIELD OF THE INVENTION

The invention relates to the field of personal wireless communication devices, and is particularly relevant to the fields of mobile telephones, PDAs, and GPS navigation devices.

BACKGROUND OF THE INVENTION

Mobile telephones and similar communication devices are rapidly expanding in functionality. In addition to basic voice communication, such devices are today providing text messaging, internet access, e-mail (with access to attached files), personal information management, document creation, digital photography and videography, and downloading, storage, and delivery of audio and video content.

To accomplish such a variety of functions, there is a need to provide keyboards (keyed or touch-screen based) for the input of commands and data, and display screens capable of presenting a considerable amount of information. This has proved to be a challenge, given the small screen area available in a hand-held device. Full-function keyboards, such as the standard QWERTY array of keys and buttons, are difficult to provide while maintaining the convenient size consumers expect of a mobile device. The addition of other functional elements, such as displays, cameras, memory modules, and dedicated control buttons and connectors for these elements, only adds to the challenge, as does the need to house a battery capable of powering all of these elements. Due in part to the conventional wisdom in the industry that "thinner is better", prior art solutions have relied on the relentless miniaturization of increasingly complex digital electronic components. As the cost and difficulty of such miniaturization are approaching practical limits, there is a need for alternative designs.

There are many commercially available devices that incorporate hidden functional elements, such as keypads, via hinged "clamshell" designs, generally having a pivoting display that flips up from a base structure containing a keypad. Another class of devices employs slide-out keypads. There are also single-screen devices, such as the Apple iPhone™, where the keypad and almost all control buttons are software-generated, and displayed as needed on a touch-sensitive screen. These designs provide a limited screen area, and the user is generally limited to the display of only one type of data, or the output of one application, at any given time. In particular, the large area claimed by a virtual keyboard leaves relatively little display area for other purposes, and much of that remaining area must be dedicated to a display of the text being entered via the keyboard. There remains a need for portable communication devices that permit the user to view multiple types of data, from multiple applications, at one time. Multi-screen designs have been put forth in order to address this need, but have not been accepted in the marketplace. Kawamura (U.S. Pat. No. 7,496,378), for example, provides a supplementary fold-out display screen grafted onto a clamshell form cell phone. The design is thick and blocky, the extra screen that folds out to the side unbalances the device, and there is no provision for multifunctional hardware.

BRIEF DESCRIPTION OF THE INVENTION

The present invention is a portable communication device having a primary display screen and one or more auxiliary display screens, which may be folded into the body of the device when not required by the user so as to retain the convenient size expected of a hand-held device. The screens are rotatably attached to the body of the device in a manner that does not obscure the primary display screen, so that they need not be deployed by the user unless they are needed.

In certain embodiments, the device of the present invention has the general shape of a coffee bean (technically, a prolate or scalene hemi-ellipsoid, with the plane perpendicular to the short semi-principal axis.) This shape provides a substantially elliptical flat surface suitable for mounting a primary display screen, and a curved opposite surface that fits into the palm and fingers of the human hand. These particular embodiments achieve hand-held convenience combined with a relatively large internal volume. The internal volume is capable of housing a large collection of electronic components that provide a wide array of services and functions, and is capable of housing batteries capable of driving all of the electronics and all of the display screens.

In a particular embodiment, the device comprises two auxiliary screens, which deploy by rotating outward in opposite directions from opposite sides of the device. The resulting T-shaped arrangement provides a large multi-screen display, without interfering with a secure and convenient one-handed grip on the body of the device.

In certain embodiments, the device comprises two or more batteries, so as to provide backup power in the event of battery exhaustion or failure, and/or to provide higher power output on demand. In certain embodiments, the device of the present invention comprises solar cells adapted to recharge the batteries.

In particular embodiments, the device of the present invention comprises a plurality of subscriber identification means, such as subscriber identification chips, circuits, or modules (SIMs), which enable the user to access a plurality of different services from one or more service providers. Each of the SIMs may be a typical SIM card or carrier card, or may be integrated into the circuitry of the device.

In certain embodiments, the device further comprises a removable wireless proximity sensor module. This sensor module, when removed from the device and kept on the person of the user, remains in continuous or intermittent communication with the device, and can alert the user when he or she moves away from the device by more than a pre-determined distance, as an aid to preventing theft or accidental loss of the device. The sensor module may comprise a transmitter capable of broadcasting a locator signal, which triggers the device to emit a perceptible warning that alerts the user when separation of the module from the device exceeds the pre-determined distance. Preferably, the user can also trigger this warning via a switch on the sensor module, in order to locate the device. Alternatively, or additionally, the sensor module itself may emit a perceptible warning signal.

Is specific embodiments, the proximity sensor module also acts as a digital lock for the device, so that the device is not operable in the absence of a coded wireless signal provided by the sensor module.

The device of the invention may be capable of receiving and transmitting a plurality of communications in a variety of modes, including for example telephone calls, text messages, and e-mail. It may also be capable of providing reminders of scheduled events entered into a calendar program. In order to inform the user of communications or reminders as they arrive or come due, the device of the present invention may, in certain embodiments, provide not only the known-in-the-art vibrating and/or audible signals, but also a visual indicator of the type of communication or notification being received. This visual indicator takes the form of color-coded indicator lights, typically LED lights, where the color (or color combination) and/or the flash frequency of the light(s) indicates whether the signal is a telephonic, text, or email communication, or a calendar alert. In preferred embodiments, the user may program the device to indicate the identity of the caller via these color-coded lights. The presence of voice mail messages, unread text and email, and unacknowledged calendar reminders, can also be indicated via the color and flash frequency of the indicator lights.

DETAILED DESCRIPTION OF THE INVENTION

Figure 1A:
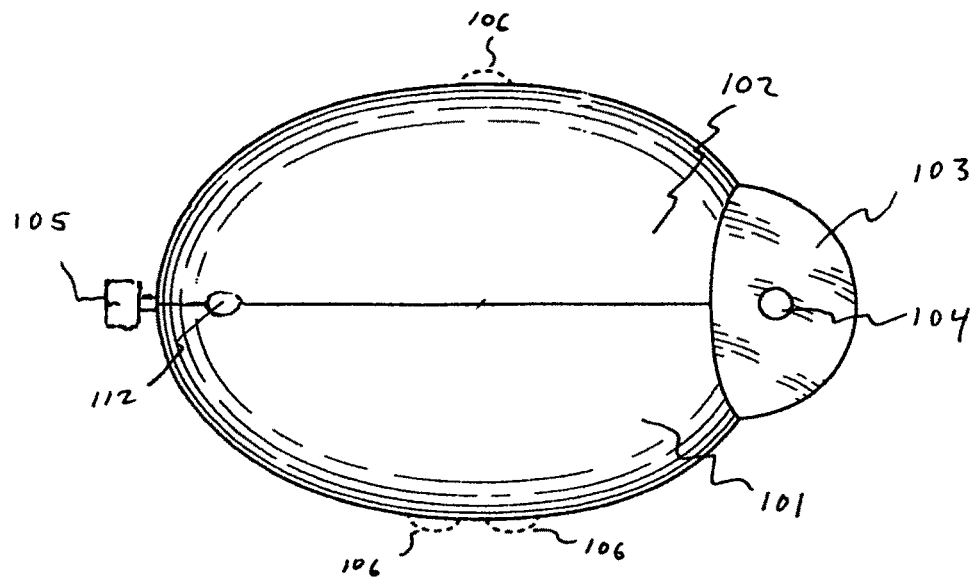
FIGS. 1A-1G show an embodiment of the invention comprising a main screen housing and two auxiliary screen housings that pivot about a common axis.

The present invention provides a mobile communication device comprising a primary housing having a primary screen, and at least a first auxiliary screen mounted in a first auxiliary housing. The first auxiliary housing is rotatably attached to the primary housing by a first pivot means, and is rotatable in a plane substantially parallel to the primary and auxiliary screens, so that the screens remain substantially parallel during the rotation. The device has a closed state, in which the auxiliary screen and auxiliary housing are located behind the primary screen, and an open state, in which the first auxiliary housing has been rotated so that the primary and auxiliary screens are both visible to the user.

In a preferred embodiment, the device of the invention further comprises a second auxiliary screen mounted in a second auxiliary housing. The second auxiliary housing is rotatably attached to the primary housing by a second pivot means, and is rotatable in a plane substantially parallel to the primary and second auxiliary screens, so that the screens remain substantially parallel during the rotation. In this embodiment, the device has a closed state, in which the first and second auxiliary screens and first and second auxiliary housings are located behind the primary screen; a semi-open state, in which the first auxiliary housing has been rotated so that the primary and first auxiliary screens are both visible to the user, with the second auxiliary housing located behind the primary screen; and a fully-open state, in which both auxiliary housings have been rotated so that the primary, first auxiliary, and second auxiliary screens are all visible to the user.

The pivot means can be of any design that rotatably connects an auxiliary housing to the primary housing. Suitable means include, but are not limited to, pins captured in axial bores, hollow cylinders captured within larger axial bores, springs, and hinges. The term "pivot means" also encompasses the many known cam, lever, slot and pin mechanisms which impart a translational component to the movement of the auxiliary housings. It will be appreciated that in hollow cylinder embodiments, the interior axial space provide a convenient passage for a ribbon cable connecting the housings.

In preferred embodiments, the pivot means is spring-loaded, in such a manner that when the device is in the closed state, the spring applies a force that biases the attached housings toward the open state. Closure of the device by the user restores energy to the spring. The relative motion of the housings around the pivot means is preferably damped, so that the transition from closed to open states is smooth. This may be achieved, for example, with a hinge pin rotating within a cylinder filled with a viscous fluid. This and other suitable spring-loaded, damped hinge mechanisms are well known in the art, as taught for example in U.S. Pat. No. 7,111,773 (incorporated herein by reference in its entirety) and the references therein.

Specific embodiments of the invention will now be described, with reference to the drawings. FIG. 1A shows a top view of one embodiment of the invention, having a first auxiliary housing 101, a second auxiliary housing 102, an upper hinge cover 103, and a removable proximity sensor module 105. A release button 112 protrudes slightly from between the auxiliary housings; depressing the release button releases the auxiliary housings from a detent mechanism (not shown) and allows them to swing apart into the open state. Control buttons 106 are located along the sides of the device, and may be programmed to serve basic functions such as muting, telephone pick-up and hang-up, camera shutter, and toggling or cycling among display modes. A camera lens 104 is located on the upper hinge cover.

Figure 1B:
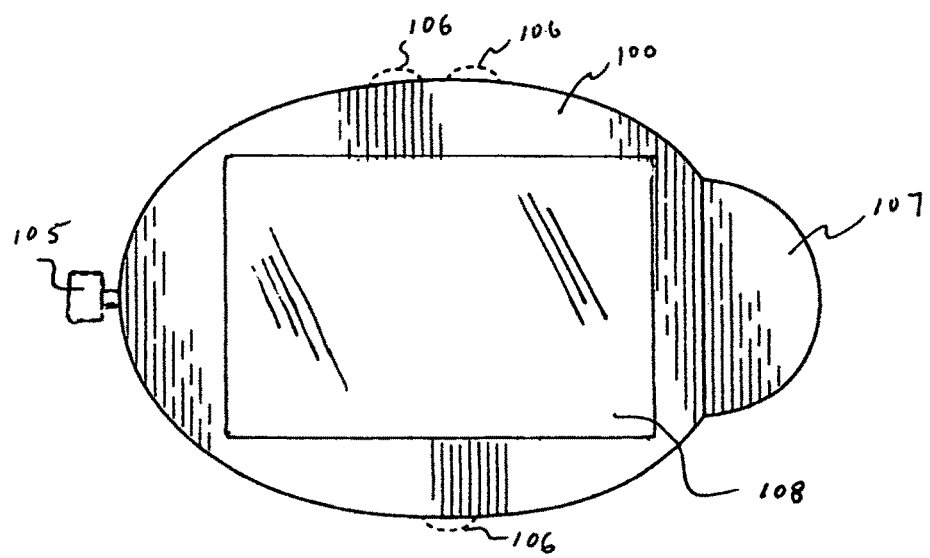

FIG. 1B shows a bottom view of the same embodiment, in which display screen 108 is mounted in the flat surface of the main housing 100. The bottom hinge cover 107 may, in certain embodiments, be integral with the main housing 100.

Figure 1C:
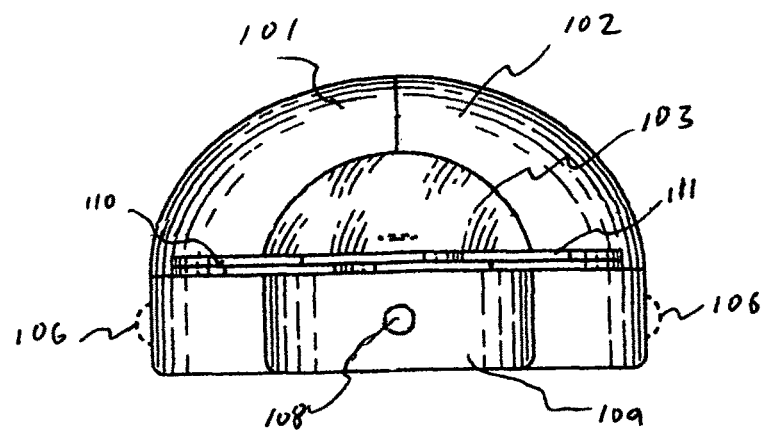

FIG. 1C shows a front view of the same embodiment LED indicator light 108 is mounted within the lower hinge cover 109. Auxiliary housing 101 is fixedly attached to lower hinge plate 110, and auxiliary housing 102 is fixedly attached to upper hinge plate 111.

Figure 1D:
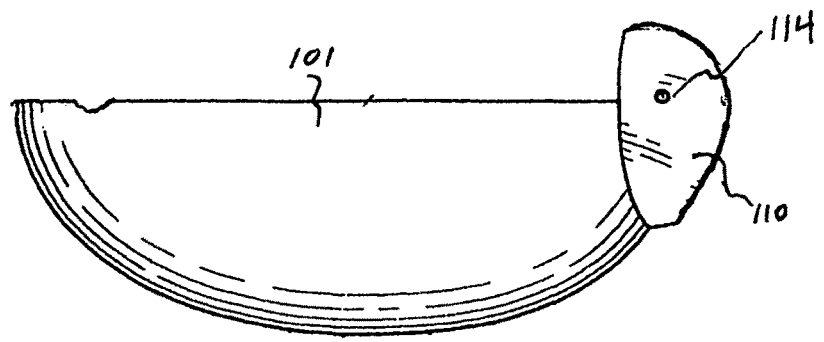

FIG. 1D shows a top view of auxiliary housing 101 and attached lower hinge plate 110, in isolation from the device. The hinge plate defines a hole 114 through which a pin (not shown) extends from upper hinge cover 103 to lower hinge cover 109 when the device is assembled. Auxiliary housing 102 and attached hinge plate 111 are similarly arranged, and the holes in the hinge plates are aligned when the device is assembled. When assembled, hinge plate 111 lies over hinge plate 110, and the auxiliary housings rotate along with the hinge plates when the device is opened. Slots (not shown) in each auxiliary housing permit the hinge plate attached to the opposing housing to pass as the housings rotate to the open position.

Figure 1E:
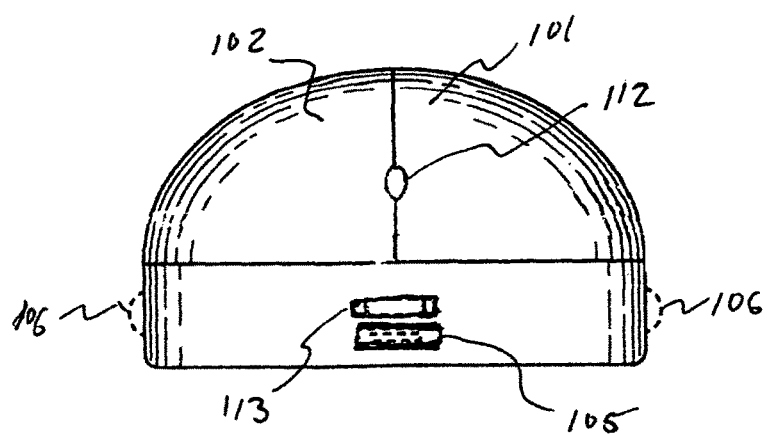

FIG. 1E shows a rear view of the device, which in this embodiment features a mini- or micro-USB socket 113, which is used, as is know in the art, for attachment of a charger and for connection to a computer.

Figure 1F:
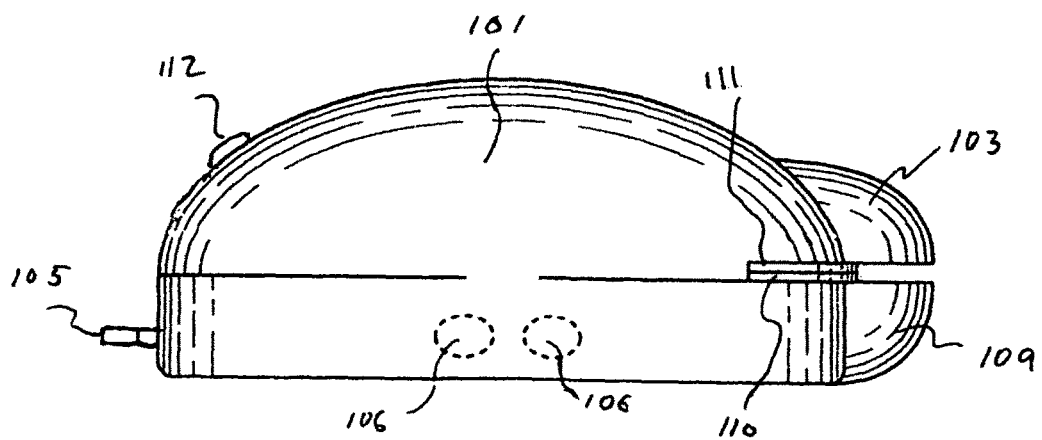

FIG. 1F is a side view of the device.

Figure 1G:
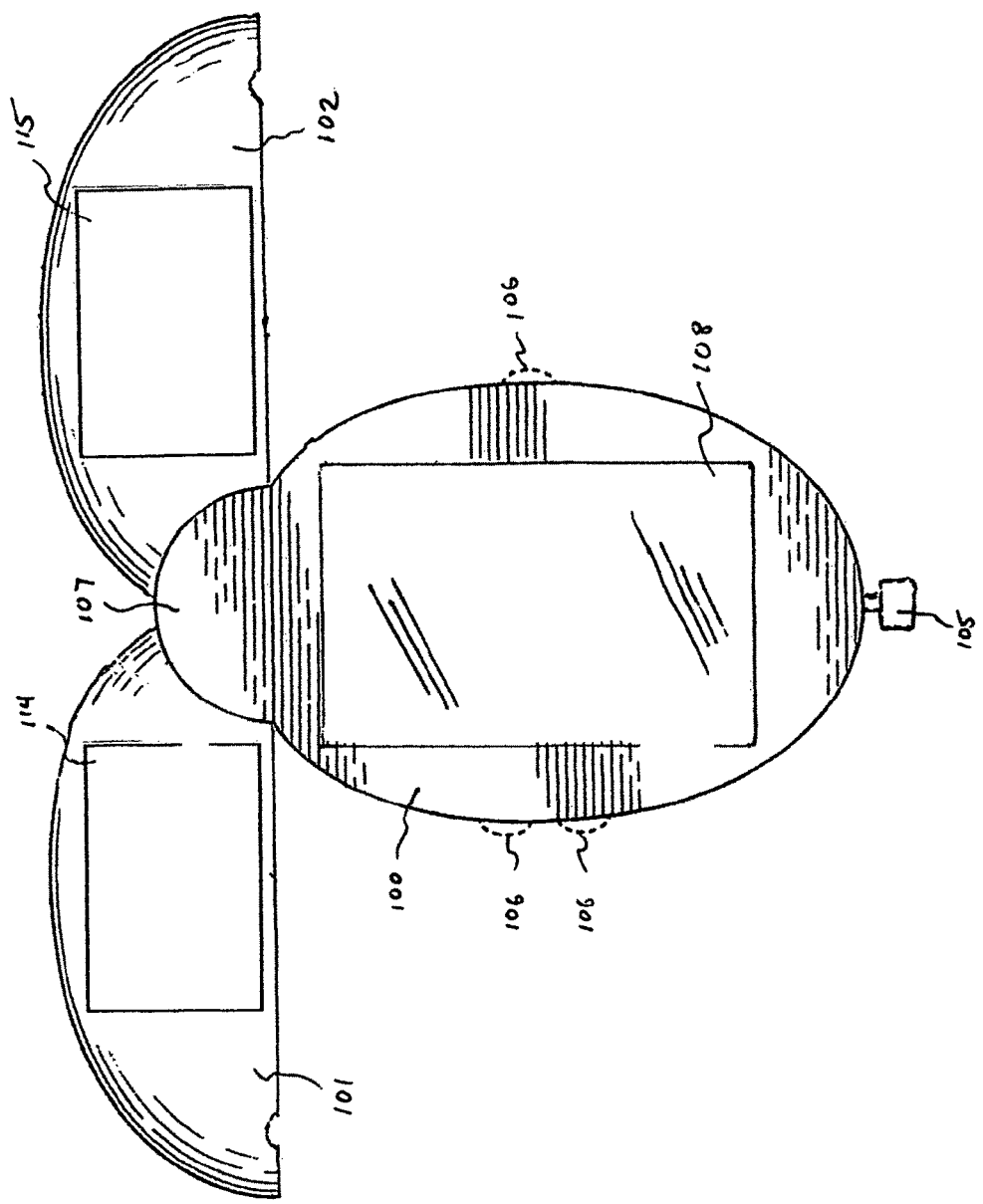

FIG. 1G is a bottom view of this embodiment, with the auxiliary housings in the open position. First auxiliary screen 114 and second auxiliary screen 115 are mounted in the flat lower surfaces of the auxiliary housings 101 and 102, respectively.

Figure 2A:
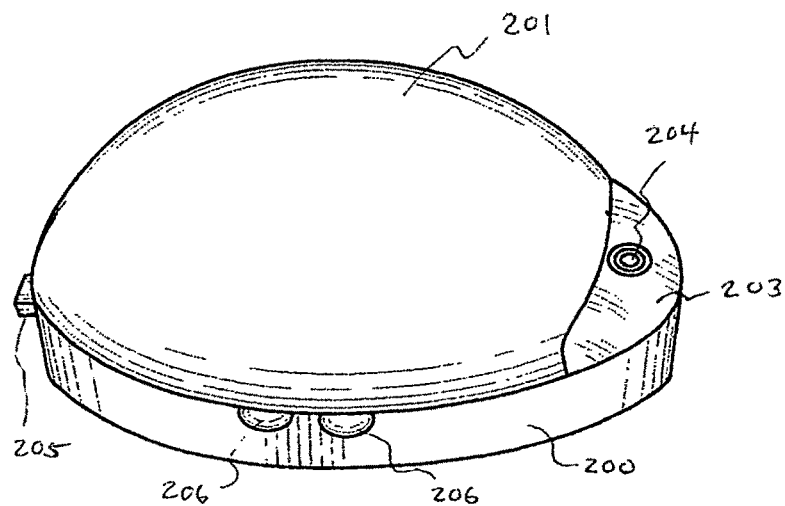
FIGS. 2A-2C shows an embodiment of the invention comprising a main screen housing and a single auxiliary screen housing.

FIG. 2A shows a perspective view of an alternative embodiment, having a single auxiliary housing 201 rotatably attached to a main housing 200 via a pivoting means (not shown). Control buttons 206 are located along the sides of the device, and may be programmed to serve basic functions such as muting, telephone pick-up and hang-up, camera shutter, and toggling or cycling among display modes. A camera lens 204 is located on the upper hinge cover 203, and proximity sensor module 205 is inserted into main housing 200.

Figure 2B:
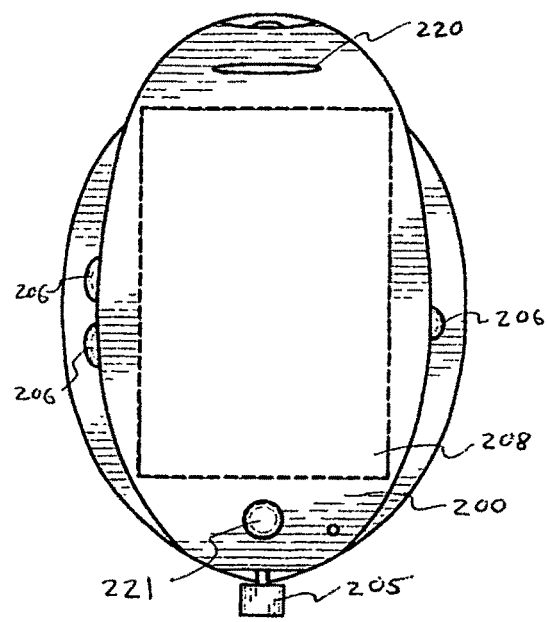

FIG. 2B shows a bottom view of this embodiment, having a second camera lens 221, a speaker opening 220, and a display screen 208.

Figure 2C:
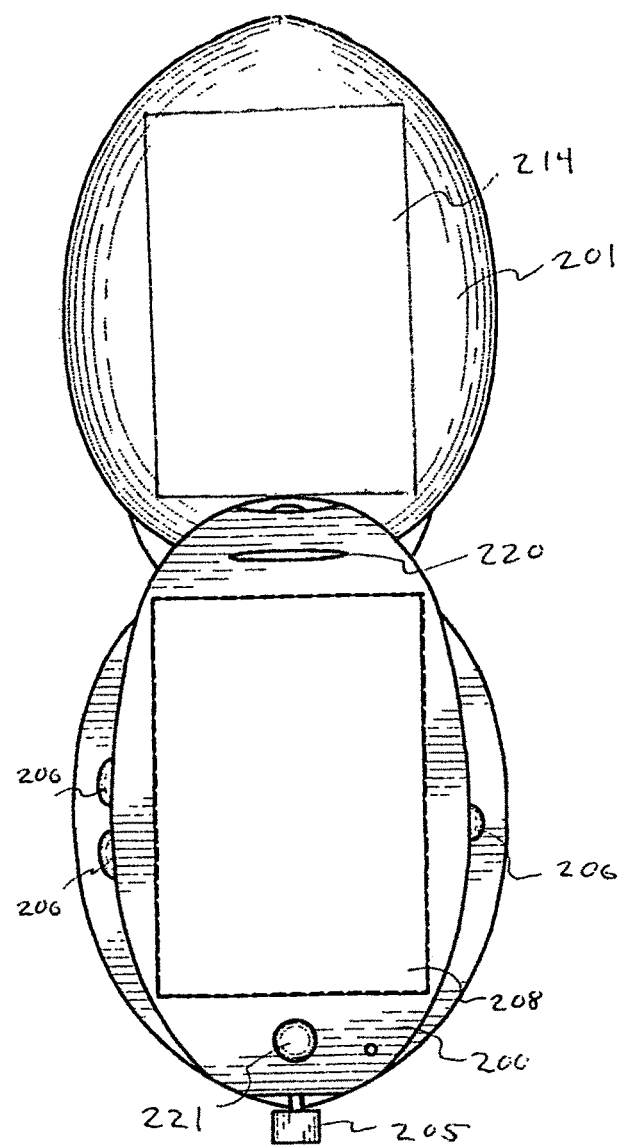

FIG. 2C is a bottom view of the same embodiment in the open position. An auxiliary screen 214 is mounted in the underside of auxiliary housing 201, and becomes visible upon a 180 degree relative rotation of the two housings.

Figure 3A:
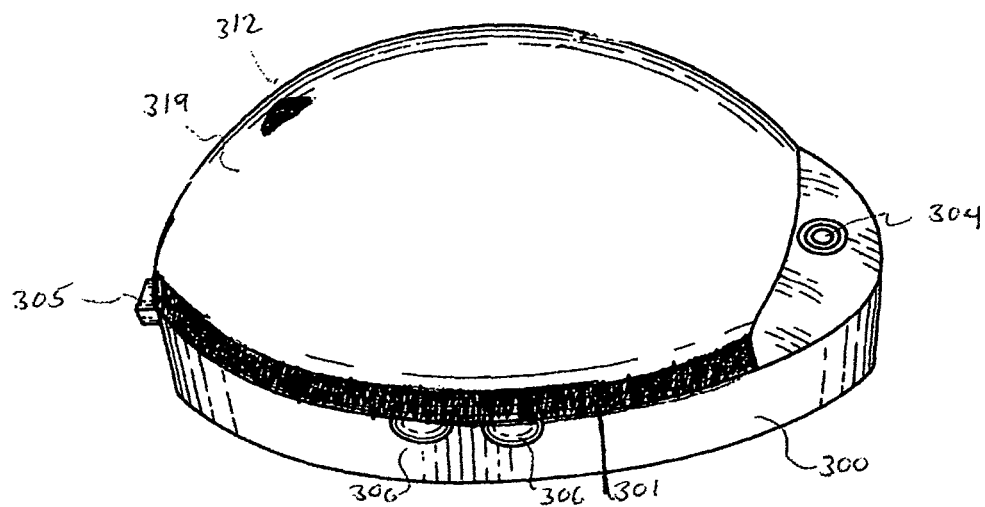
FIGS. 3A-3C show an embodiment of the invention comprising a main screen housing and two internal auxiliary screen housings, which pivot about two independent axes.

FIG. 3A is a perspective view of a third embodiment of the invention, having a first auxiliary housing 301, a second auxiliary housing 302 (not visible), and a release button 312 protruding slightly from a top cover 319; depressing the release button releases the auxiliary housings from a detent mechanism (not shown) and allows them to swing apart into the open state. The auxiliary housings have substantially flat top and bottom surfaces, and in the closed state they are located between the main housing 300 and the top cover 319. Preferably, they are only thick enough to mechanically support and protect the display screens mounted therein. In addition to the main and auxiliary housings, the top cover 319 encloses a substantial volume suitable for housing electronic components and batteries. Control buttons 306 are located along the sides of the device, and may be programmed to serve basic functions such as muting, telephone pick-up and hang-up, camera shutter, and toggling or cycling among display modes. A camera lens 304 is located on the upper surface of the main body 300, and proximity sensor module 305 is inserted into the main housing.

Figure 3B:
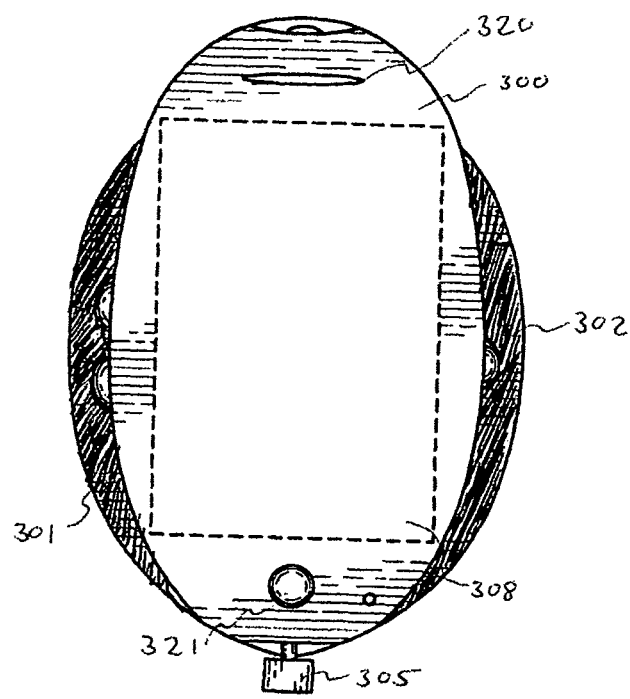

FIG. 3B shows a bottom view of the same embodiment, in which display screen 308 is mounted in the flat surface of the main housing 300. The main housing features a second camera lens 321, and a speaker opening 320.

Figure 3C:
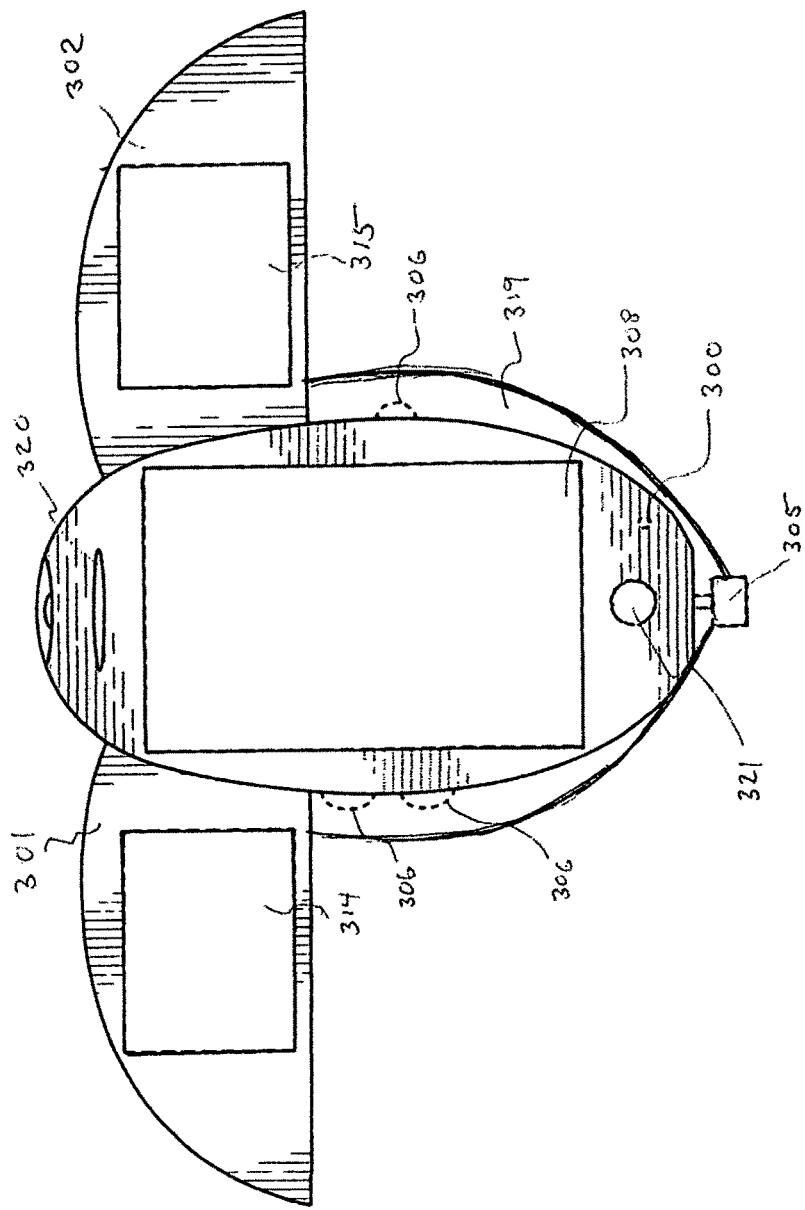

FIG. 3C is a bottom view of this embodiment, with the auxiliary housings in the open position. First auxiliary screen 314 and second auxiliary screen 315 are mounted in the flat lower surfaces of the auxiliary housings 301 and 302, respectively.

Figure 4A:
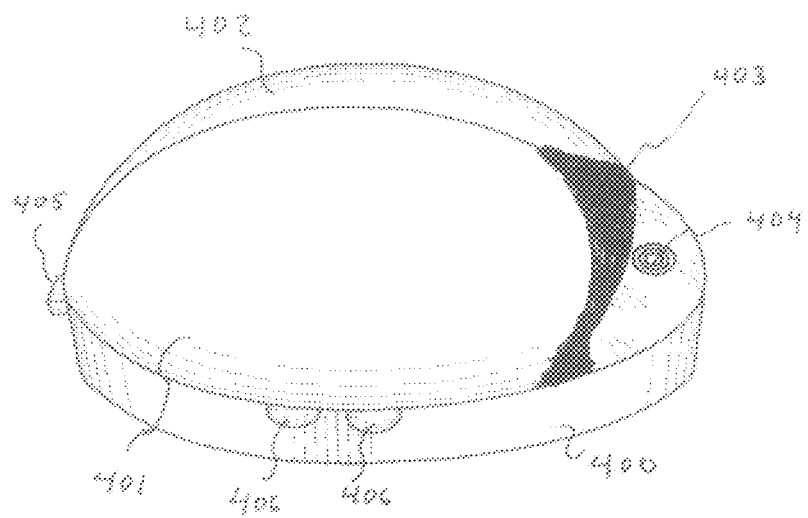
FIGS. 4A-4C show an embodiment of the invention comprising a main screen housing and two auxiliary screen housings, which pivot about two independent axes.

FIG. 4A shows a perspective view of one embodiment of the invention, having a first auxiliary housing 401, a second auxiliary housing 402, a fairing cover 403, and a removable proximity sensor module 405. Depressing a release button (not shown) releases the auxiliary housings from a detent mechanism (not shown), which allows the auxiliary housings to swing apart into the open state. Control buttons 406 are located along the sides of the device, and may be programmed to serve basic functions such as muting, telephone pick-up and hang-up, camera shutter, and toggling or cycling among display modes. A camera lens 404 is located on the upper hinge cover.

Figure 4B:
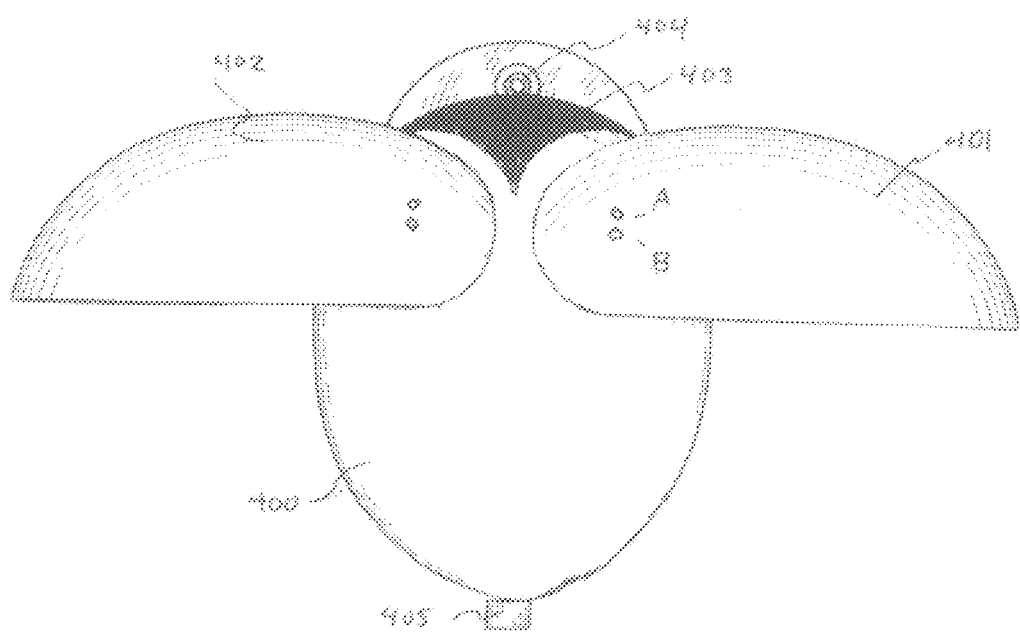

FIG. 4B is a top view of this embodiment, with the auxiliary housings rotated about pivot point "A" into the open position. First and second auxiliary screens (not shown) are mounted in the flat lower surfaces of the auxiliary housings 401 and 402. Rotation about pivot point "A" moves the auxiliary housings outward and to the rear of the main housing 400; this exposes a greater area for the auxiliary screens and allows the auxiliary housings to rotate without interfering with the fairing cover 403.

Figure 4C:
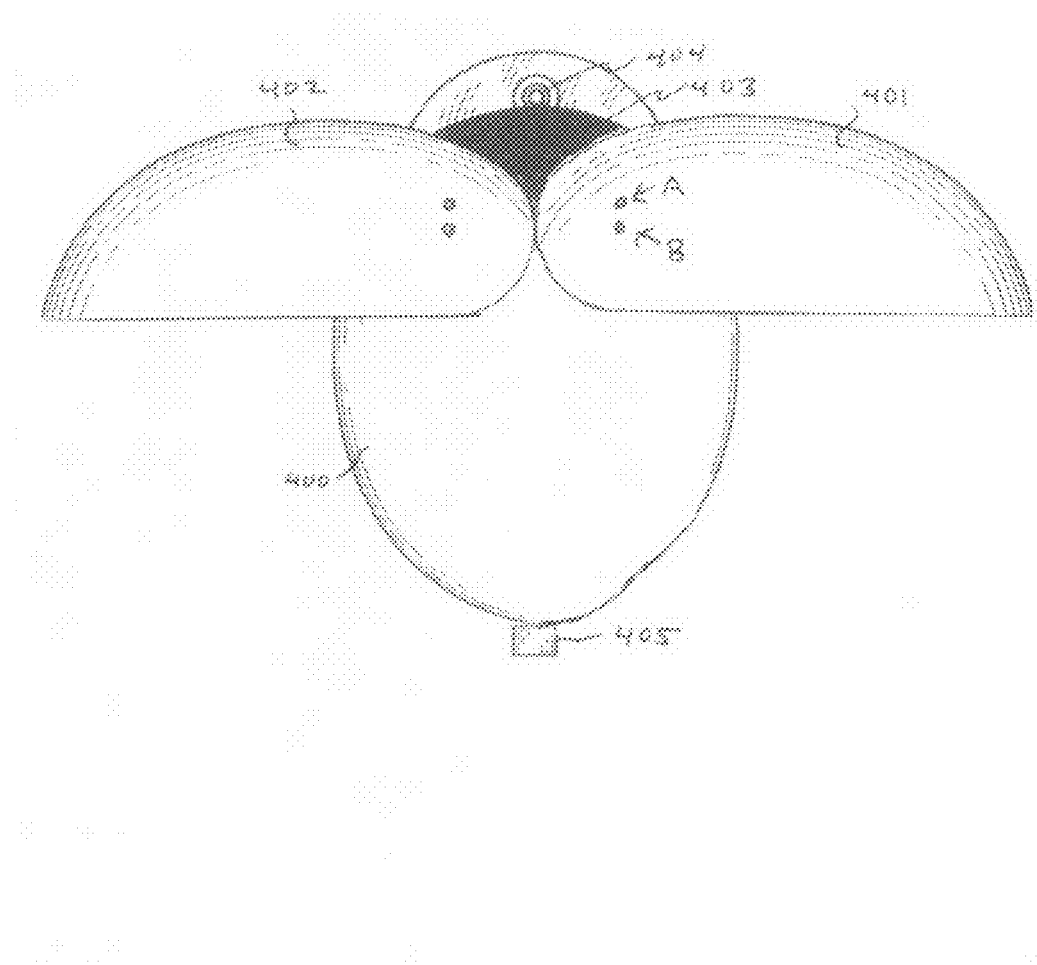

FIG. 4C is a top view of an alternative embodiment, with the auxiliary housings rotated about pivot point "B" into the open position. First and second auxiliary screens (not shown) are mounted in the flat lower surfaces of the auxiliary housings 401 and 402. Pivot point "B" is located at the center of a circle that is defined by the front edge of the auxiliary housing. As a result, rotation about pivot point "B" does not move the auxiliary housings outward or to the rear of the main housing 400; in this embodiment the fairing cover 403 may serve as a partial socket of a ball-and-socket joint, helping to stabilize the auxiliary housings. Fairing cover 403 may optionally be made of an elastomeric material, which is slightly compressed by the outer surface of the auxiliary housings where their profile begins to depart from a circular cross section.

Figure 5A:
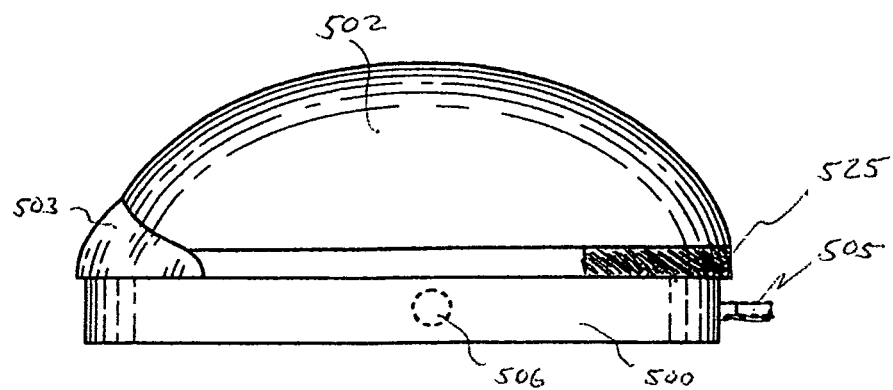
FIGS. 5A-5D show an embodiment of the invention comprising a main screen housing and two auxiliary screen housings, which pivot about two independent axes, and a sliding housing in which are mounted control devices.

FIG. 5A shows a side view of yet another embodiment of the invention, having a main housing 500, a first auxiliary housing 502, a second auxiliary housing 501 (not visible), a fairing cover 503, and a removable proximity sensor module 505. Depressing a release button (not shown) releases the auxiliary housings from a detent mechanism (not shown), which allows the auxiliary housings to swing apart into the open state. Control buttons 506 are located along the sides of the device, and may be programmed to serve basic functions such as muting, telephone pick-up and hang-up, camera shutter, and toggling or cycling among display modes. A sliding housing 525 is shown in the retracted position.

Figure 5B:
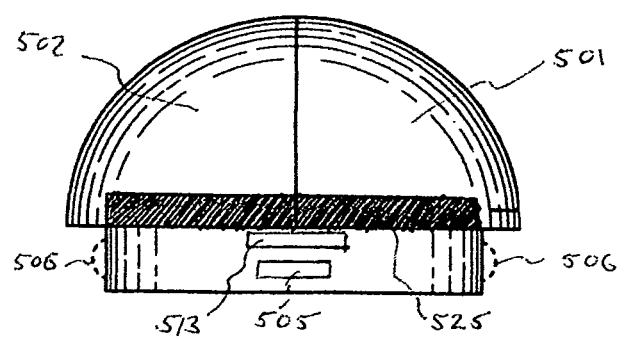

FIG. 5B is a rear view of this embodiment, showing auxiliary housings 501 and 502 encasing the sliding housing 525. A mini-USB or micro-USB port 513, and the proximity sensor module 505, are shown embedded in the main housing 500.

Figure 5C:
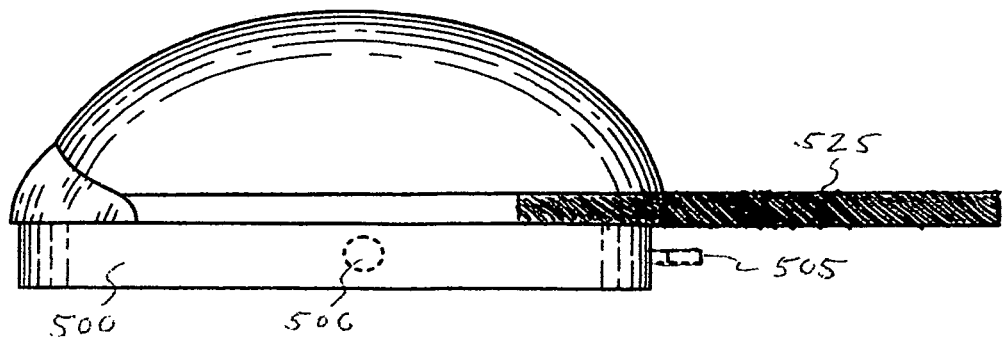

FIG. 5C is a side view, similar to FIG. 5A but with the sliding housing 525 in the extended position.

Figure 5D:
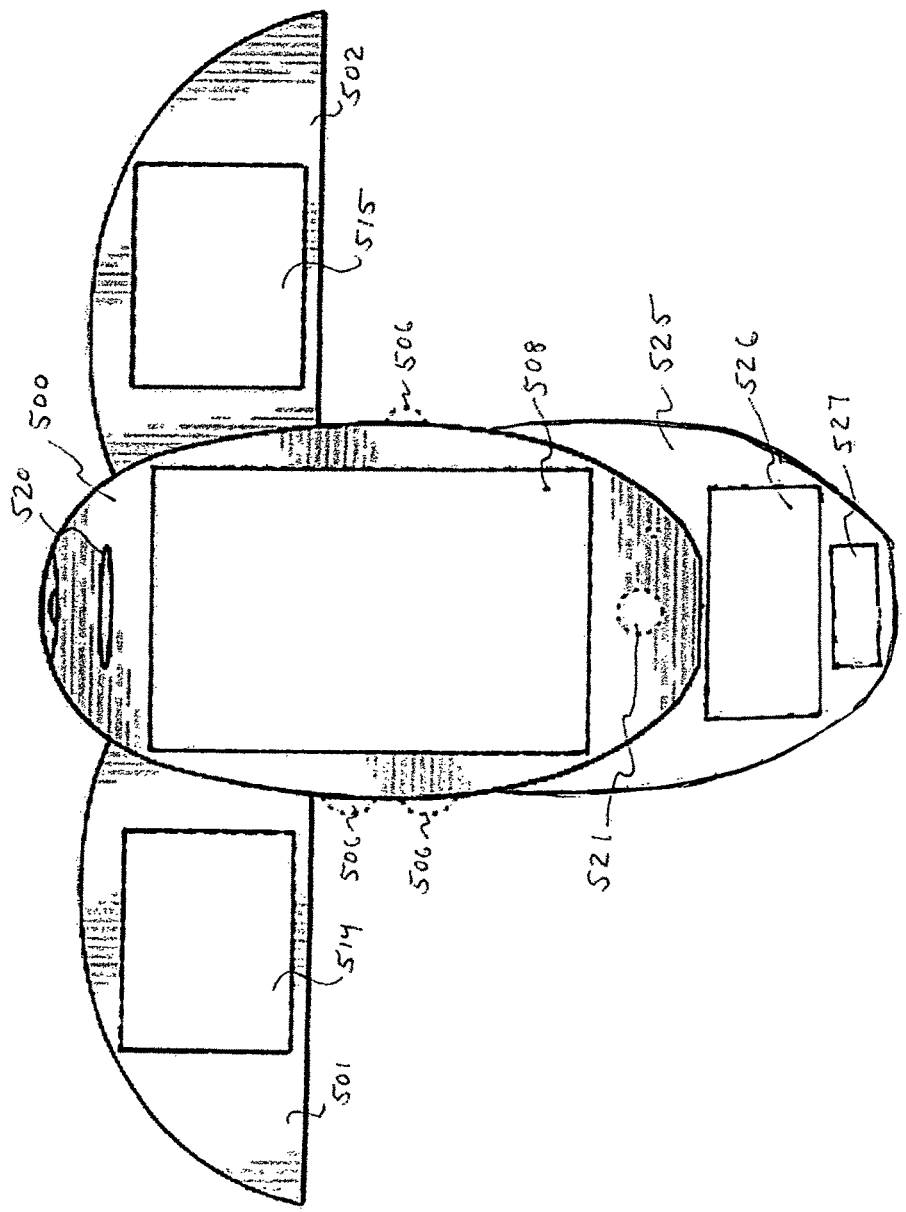

FIG. 5D is a bottom view of this embodiment, with the auxiliary housings in the open position and the sliding housing in the extended position. First auxiliary screen 514 and second auxiliary screen 515 are mounted in the flat lower surfaces of the auxiliary housings 501 and 502, respectively. Mounted in the bottom surface of the main body 500 are a camera lens 521, a speaker opening 520, and main display screen 508. Mounted in the bottom surface of the sliding housing 525 are a first input device 526 and a second input device 527. The first input device 526 may be a set of alphanumeric keys, such as a telephone keypad, or it may be a touch pad for controlling a cursor and/or selecting items on one or more of the display screens. The second input device 527 may be a set of control buttons, having functions similar to those of buttons 506, a touch pad, an isometric joystick (e.g. TrackPoint™ or TouchStyk™), or a trackball.

Figure 6A:
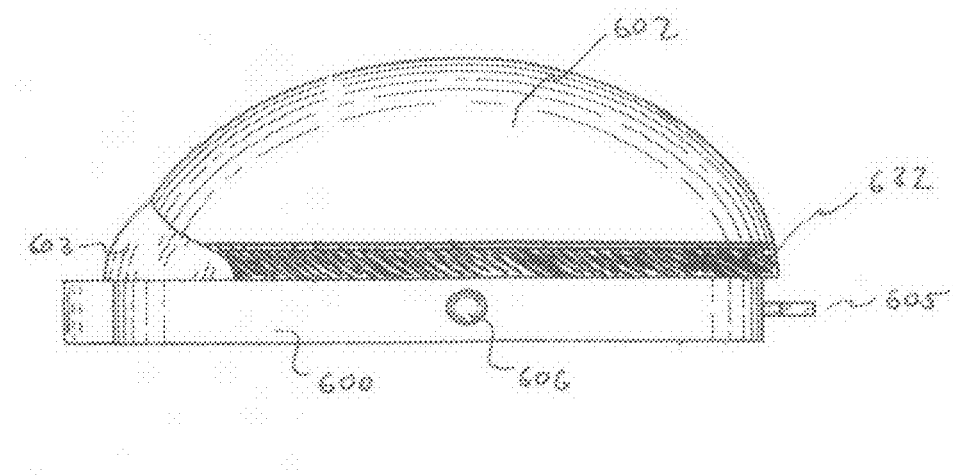
FIGS. 6A-6C show an embodiment of the invention comprising a main screen housing, two auxiliary screen housings, and two internal auxiliary housings, which pivot about two independent axes.

FIG. 6A is a side view of yet another embodiment of the invention, having a main housing 600, a first auxiliary housing 602, a second auxiliary housing 601 (not visible), a fairing cover 603, and a removable proximity sensor module 605. Depressing a release button (not shown) releases the auxiliary housings from a detent mechanism (not shown), which allows the auxiliary housings to swing apart into the open state. Control buttons 606 are located along the sides of the device, and may be programmed to serve basic functions such as muting, telephone pick-up and hang-up, camera shutter, and toggling or cycling among display modes. An internal auxiliary housing 632 is shown in the retracted position.

Figure 6B:
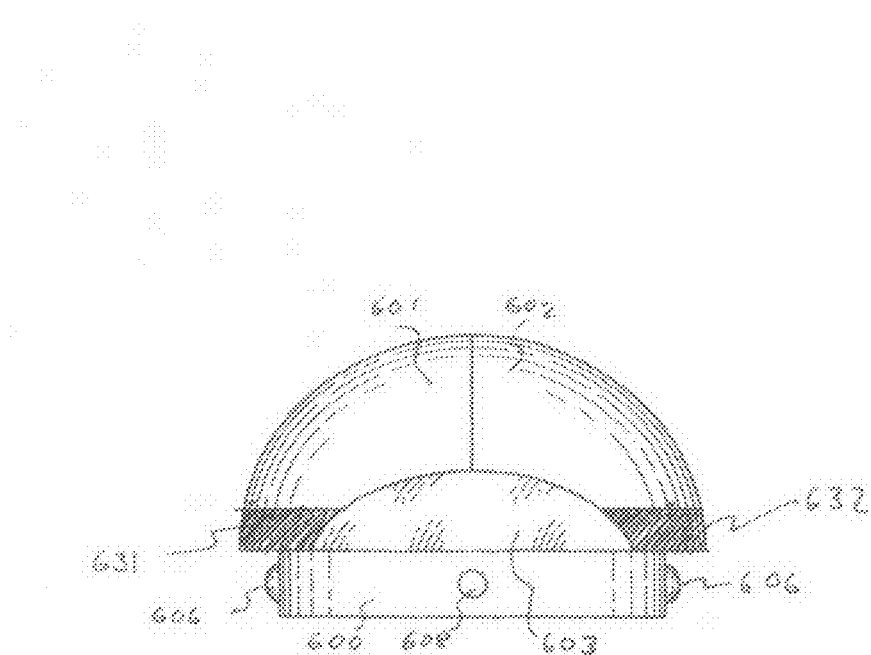

FIG. 6B is a front view of this embodiment. LED indicator light 608 is mounted within the main housing 600. Auxiliary housings 601 and 602 are shown in the closed position, over the internal auxiliary housings 631 and 632, which are also shown in the closed position.

Figure 6C:
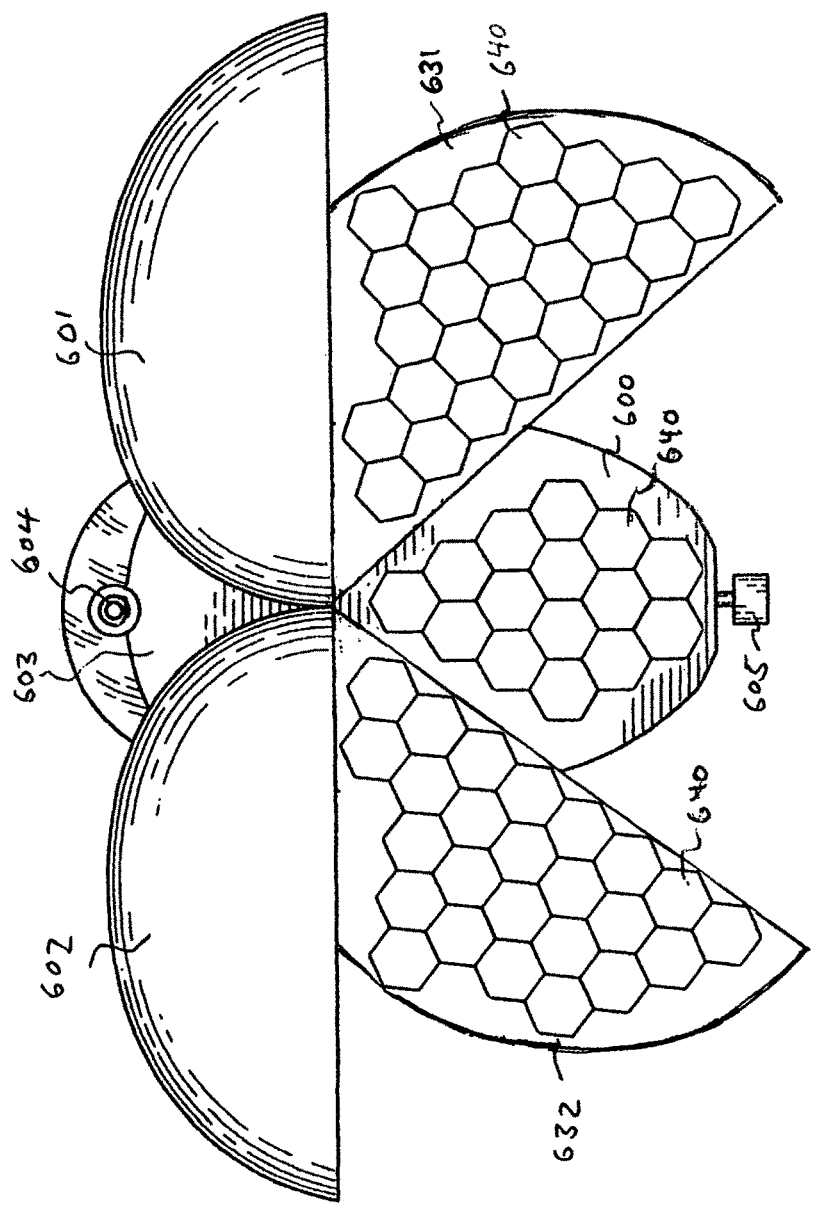

FIG. 6C is a top view of this embodiment, showing the auxiliary housings 601 and 602, and the interior auxiliary housings 631 and 632, in the open position. Camera lens 604 and proximity sensing module 605 are mounted in the main body 600. Solar cells 640 are mounted in the upper surfaces of main body 600 and interior auxiliary housings 631 and 632. Power generated by the solar cells is conducted internally to the battery recharging circuits.

In certain embodiments, the auxiliary housings 601 and 602 are transparent, or are provided with transparent windows, so that solar cells 640 may be irradiated without deployment of the auxiliary housings.

Figure 7A:
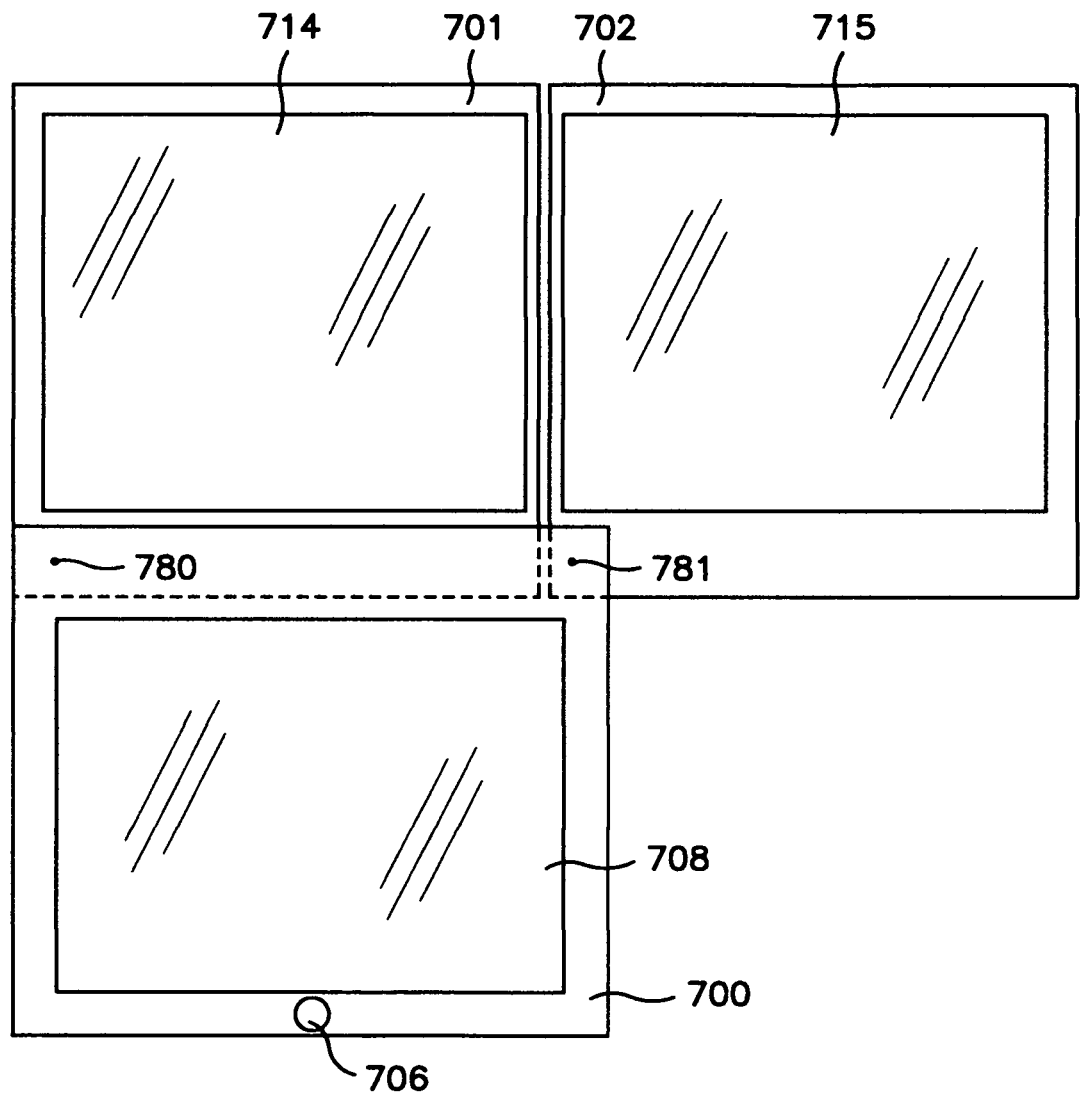
FIGS. 7A-7C show an embodiment of the invention comprising a main screen, and two auxiliary screen housings, which pivot about two independent axes by opposite rotations of 270 and 180 degrees.

FIG. 7A is a front view of the open state of one embodiment of the invention, having a main housing 700 with main screen 708 and control button 706, a first auxiliary housing 701, and a second auxiliary housing 702, bearing auxiliary screens 714 and 715, respectively. Software may optionally treat screens 714 and 115 as two halves of a single screen. In such an embodiment it is desirable to minimize the visible seam between the screens 714 and 715, and accordingly they may be located within their respective housings so as to be as close to one another, in the open state, as manufacturing technology permits. Pivot means are represented as points indicating the axes (780 and 781) of rotation. In the particular embodiment illustrated, a single control button 706 powers the device on and off, and screen 708 is a touch screen through which all other controls are effected.

Figure 7B:
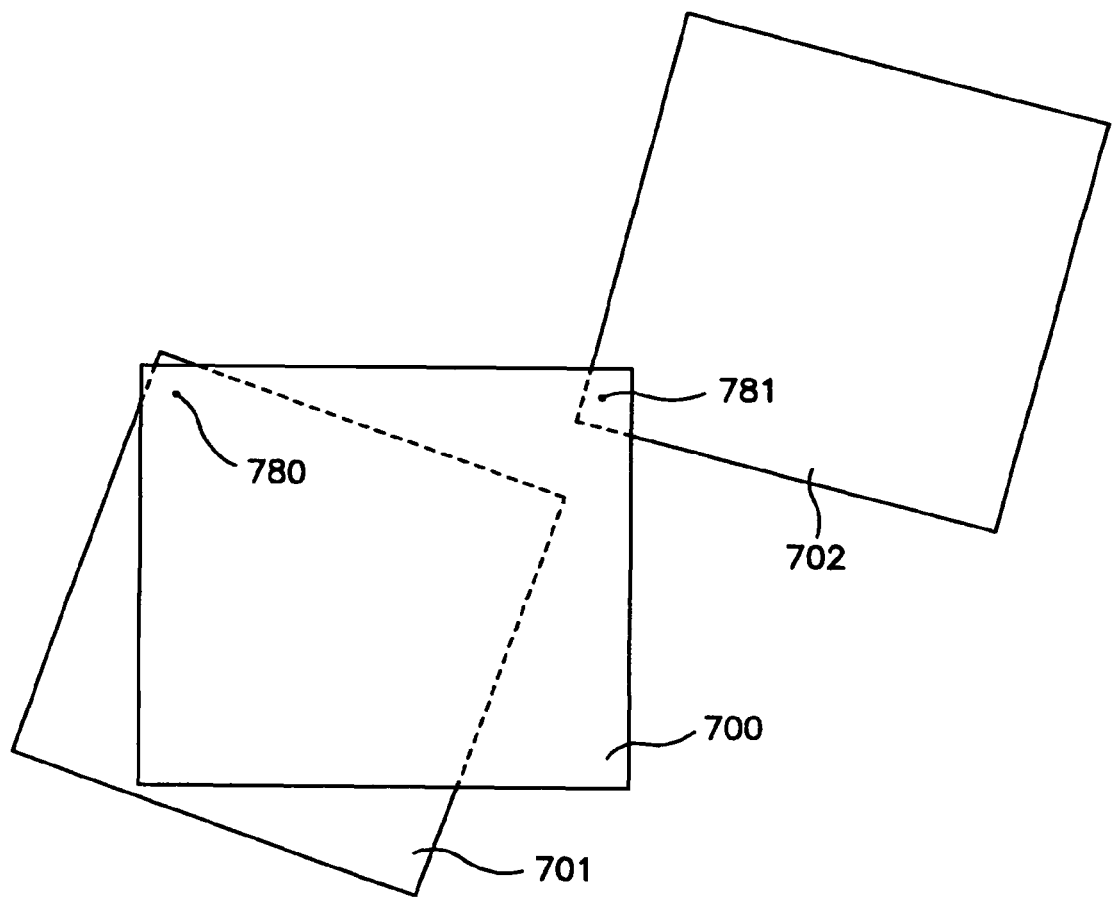

FIG. 7B shows a front view of the same embodiment, with the auxiliary housings partially deployed. Screens 708, 714, and 715 are omitted for clarity. The arrows indicate the direction of rotation toward the fully open state. Auxiliary housing 701 rotates about axis 780 by 270° during deployment, while auxiliary housing 702 rotates 180° in the opposite direction, about axis 781. In certain embodiments, at least one of the auxiliary housings is slidably mounted to its pivot means, or undergoes a helical motion upon deployment, so that the auxiliary screens may be brought into a coplanar relationship when deployed into the open state, while being in separate and non-interfering planes in the closed state. This may be accomplished, for example, with a pivot pin having a screw thread of the appropriate pitch.

Figure 7C:
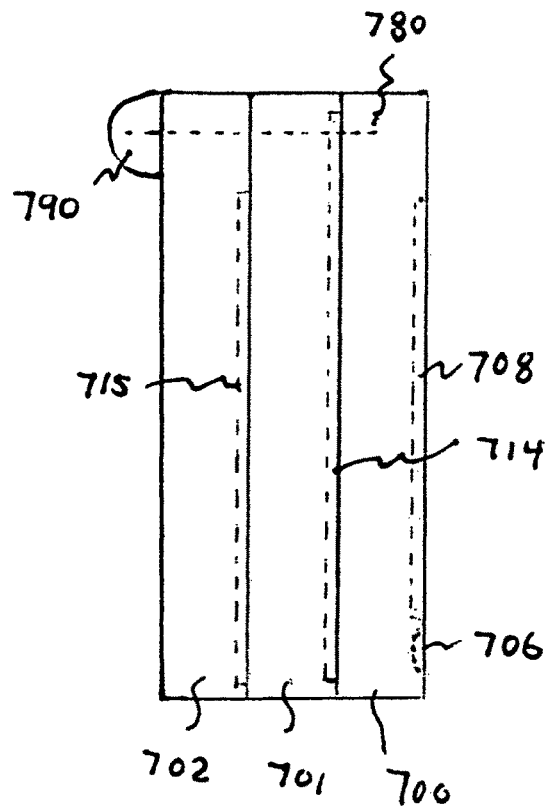

FIG. 7C shows a side view of the same embodiment. The rotation axis 780 is shown schematically. A reinforcing bar 790 connects the back ends of the two pivot means and helps retain the auxiliary housings, and provides added rigidity to the device.

It will be appreciated that elements from the different representative embodiments illustrated in the Figures may be combined into additional embodiments. For example, the solar cells illustrated in FIG. 6C may be deployed on the upper surfaces of the auxiliary housings, and/or on the upper surface of the main housing of any of the other embodiments, where they may be exposed to sunlight by placing the auxiliary housings in the open position.

It will be appreciated that a relatively large array of solar cells may be presented to the sun when the device is in the open state. Solar cells mounted upon deployed auxiliary housings, in particular, are not obstructed by the hand of the user when the device is in use.

The device will include at least one central processing unit (CPU), which may comprise one or more microprocessors. The microprocessors may be "general purpose" microprocessors, a combination of general and special purpose microprocessors, or ASICS. Additionally or alternatively, the CPU may include one or more reduced instruction set (RISC) processors, video processors, and/or wireless chipsets. The CPU may provide processing capability to execute an operating system, run various applications, and/or provide processing for one or more of the functions described herein. Applications that may run on the device may include, for example, software for managing and playing audiovisual content, software for managing a calendar, software for controlling telephone capabilities, and software for managing communications protocols.

A main memory may be communicably coupled to the CPU, which may store data and executable code. The main memory may comprise volatile memory such as RAM, but may also include nonvolatile memory, such as read-only memory (ROM), and flash memory. The CPU may be communicably coupled to storage means, such as flash memory or a hard disk drive. In buffering or caching data related to operations of the CPU, the main memory may store data associated with applications running on the device. The nonvolatile storage may store data files such as media (e.g., music and video files), software (e.g., for implementing functions on the device), preference settings, credit card and other financial information, wireless connection information (e.g., information that may enable media device to establish a wireless connection such as a telephone connection), subscription information, and telecommunications information (e.g., telephone numbers).

In the above-described embodiments, the main screen, first auxiliary screen, and second auxiliary screen may be controlled by a CPU (not shown) that sends different data to the various screens. Suitable processors are known in the art, such as the Intel Atom™ processor, Samsung Hummingbird™, and Apple A4™. Display screens may employ any technology known in the art, such as OLED and AMOLED. Preferably, at least the main screen is touch-sensitive, and the software takes advantage of multi-touch technology. With each screen dedicated to a different process, it is possible, for example, for a user to view a web page on the main screen, a calendar on an auxiliary screen, and contact information on another auxiliary screen, while carrying on a conversation that deals with the information on all three screens.

The processors and display screens may be powered by a main battery and one or more auxiliary batteries, each of which may be housed in the main or auxiliary housings. In specific embodiments, the communications device comprises computer-readable memory, within which is stored software. The software may include power management software for controlling the charging, and use of batteries. In one embodiment, the software ensures that auxiliary batteries are drawn upon only when the device requires more current than a single battery can provide. The software may further control battery charging, so that depleted batteries are given priority when the available recharging current is limited.

The power management software may further control battery use, whereby one battery is designated as a reserve battery, and the power management system is programmed to detect the power needs of the device, and is programmed to draw power from the reserve battery only when necessary to meet the detected need.

In certain embodiments, the power management software is programmed to detect whether an auxiliary housing has been deployed, and is configured (or may be configured by the user) to provide power to the electronics serving said housing only if deployment is detected. (An auxiliary housing is "deployed" when it is rotated into the open state or detached from the main housing.)

The software may also be configured to hold in reserve an emergency charge, sufficient to power the device for a pre-defined limited period. The emergency charge is released to the device by the software only when the user engages a dedicated "panic button", and/or dials "911" or another pre-defined emergency number. In certain embodiments, the panic button is itself configured to cause the device to initiate a 911 call. In specific embodiments, where the device contains a GPS unit, operation of the panic button causes a synthesized voice to convey the geographic coordinates of the device to the 911 operator, without further user intervention. The pre-defined limited period may be selectable in advance by the user, or may be pre-programmed, and will generally be sufficient for at least a one-minute call with the weakest usable connection. The panic button may, in some embodiments, employ a data channel as well as a voice channel to transmit an emergency message.

The electronic components within the housings may communicate by means of conductors, for example ribbon cables, passing through openings (not shown) in the housings, which are situated so as to maintain a passage between the housings as the device transitions between open and closed states. In other embodiments, sliding contacts may maintain electrical connectivity between the housings. In an alternative embodiment, where a housing contains its own battery, the ribbon cable is not necessary, and the components within the housing may instead communicate via a short-range wireless signal (e.g. BlueTooth™). It will be appreciated that it is advantageous in these embodiments to employ individual SIMs within each housing, to minimize the amount of data that is transmitted wirelessly between the housings. Plural SIMs enable the user to subscribe to multiple services and/or multiple service providers, which can improve coverage and may allow the selection of the best or most economical provider for each type of service (telephony, messaging, email, internet access, etc.)

In specific embodiments of the invention, each SIM is operatively connected to a microprocessor located in the same housing as the SIM. Preferably, each microprocessor is operatively connected to the display screen that is mounted in the housing in which the microprocessor is located.

In one embodiment of the invention, where the components within each housing communicate via a short-range wireless signal (e.g. BlueTooth™) rather than by cable, one or more of the auxiliary housings are detachable from the primary housing. In such embodiments, the user may view the display on an auxiliary screen, and execute functions that are enabled on the auxiliary housing, while holding the primary housing to his or her ear.

Current cellular telephones and smart phones very rarely exceed 80 cm$^3$ in volume, and it is accepted knowledge in the art is that thinner is better. The total volume defined by the exterior of a communication device of the present invention, in certain embodiments, ranges from about 100 to about 300 cm$^3$. In specific embodiments, it will range from about 130 to about 250 cm$^3$, and in particular embodiments it ranges from about 150 to about 200 cm$^3$.

It is contemplated that the relatively large internal volume made available by certain embodiments of the invention will accommodate the hardware needed to provide a wide range of desirable features and functions. Electronic components may thus be chosen on the basis or price and performance, without the cost or performance compromises associated with miniaturization, and batteries sufficient to power the electronics for extended periods are readily accommodated.

The devices of the invention may simultaneously provide regular and video telephony, e-mail (including "push" e-mail services), voice-mail, text messaging, still and video photography, audio and video streaming, storage and playback, gaming, and internet browsing, and may support a plurality of communication modes and protocols.

An infrared interface may comply with the infrared IrDA specification for data transmission, and may receive or output control signals. One or more network interfaces may provide additional connectivity for the device. The network interfaces may include, for example, one or more network interface cards (NIC) or a network controller. In certain embodiments, the network interface may include a personal area network (PAN) interface. The PAN interface may provide capabilities to network with, for example, a Bluetooth™ or ZigBee™ (IEEE 802.15.4) network, or an ultra wideband network (UWB). Networks accessed by a PAN interface may, but do not necessarily, represent low power, low bandwidth, or close range wireless connections. The PAN interface may permit one device to connect to another local device via an ad-hoc or peer-to-peer connection.

The network interface may also comprise a local area network (LAN) interface, such as a wired Ethernet-based network, an interface to a wireless LAN, such as a WiFi (IEEE 802.11x) wireless network.

In some embodiments, the network interface may include the capability to connect directly to a wide area network (WAN) via a WAN interface. The WAN interface may permit a connection to a cellular data network, such as the Enhanced Data rates for GSM Evolution (EDGE) network or other 3G or 4G networks.

Certain embodiments may also include a near field communication (NFC) interface. The NFC interface may allow for extremely close range communication via such standards as ISO 18092, ISO 21521, or TransferJet™ protocols. Close range communication with the NFC interface may take place via magnetic field induction, allowing the NFC interface to communicate with other NFC interfaces or to retrieve information from radio frequency identification (RFID) circuits. The NFC interface may also provide a manner of initiating or facilitating a transfer of user data from the device to another communications device, computer, or sales register.

Bluetooth™, WiFi, 3G and 4G network access, GPS services, and a wide variety of computing functions may be executed by built-in software, or by downloadable applications ("apps").

The device is intended to be used with a wired or Bluetooth™ wireless headset or earpiece, but a speaker may be embedded in the main body, as shown in some of the illustrated embodiments, so as to enable use of the device as a simple cellular telephone handset.

The devices of the present invention are so designed that when in the closed state, they may easily be used as uncomplicated cellular telephones. In certain embodiments, when in the closed state, only the basic cellular telephone electronics are in a powered state. When the auxiliary housings and screens are deployed, a great deal of additional functionality becomes available. In certain embodiments, the devices of the present invention are programmed to activate additional features upon detecting the deployment of the auxiliary screens. Means for detecting the physical state of a device and executing procedures accordingly are known in the art; see for example U.S. Pat. No. 7,496,378 (incorporated by reference in its entirety) and references cited therein.

The electronic components required to carry out or enable all of these functions, and to route information to multiple display screens, are well known in the art and will not be discussed herein. Examples may be found in U.S. Pat. No. 7,092,247 and 7,636,071 (incorporated herein by reference in their entireties) and the references cited therein; these technologies are already embodied in commercial products such as the Apple iPhone 4™, iPad™, and Motorola Droid™ devices. It has heretofore been challenging and costly to miniaturize all of these components to the point that they can all be fit into the standard cell-phone form, and it has been equally difficult to fit sufficient batteries into these devices to power a multitasking processor and all of the desired features. By departing from the standard form factor, certain embodiments of the present invention make it possible to provide every feature commonly desired in a portable electronic communications device.

The removable wireless proximity sensor module serves as a locator for the communications device. It is intended to be separable from the communications device and kept on the person of the operator, for example in a purse or pocket, on a keychain, or on a bracelet or necklace. Similar "finding" devices are known in the art; see for example U.S. Pat. Nos. 6,774,787 and 7,664,463 (both incorporated by reference in their entireties) and references cited therein, and the basic technology is familiar to those of skill in the art.

In one embodiment, the proximity sensor module is configured to send intermittent queries to the communication device, and the communication device is configured to respond with an acknowledgement that the query was received. The communications device is configured to communicate at least intermittently with the module (i.e., detect and acknowledge such queries) even when nominally powered off by the user. The proximity sensor module emits a perceptible alarm signal (e.g., sound, vibration, and/or light) when it detects that the communication device has not responded to a query, and/or when it detects that the acknowledgement signal strength is below a predetermined lower limit, and optionally when the communications device reports a low battery condition. The user may thereby be warned that the device may have been left behind, or may have been carried off by a thief.

In an alternative embodiment, the communication device is configured to send intermittent queries to the proximity sensor module, and the proximity sensor module is configured to respond with an acknowledgement that the query was received. The communications device is configured to communicate at least intermittently with the module (i.e., transmit the queries and detect the acknowledgements) even when nominally powered off by the user. The proximity sensor module emits an alarm signal (sound, vibration, and/or light) when it detects that it is not receiving queries, or when it detects that the query signal strength is below a predetermined lower limit.

The proximity sensor module may also be equipped with a "paging" function, whereby the user can remotely cause the communication device to emit a sound and/or light signal that helps the user locate the device. The communications device may be configured to override a "silent mode" setting, if such a setting is in effect, when paged by the proximity sensor module, and may be further configured to detect and respond to a paging signal even when nominally powered off by the user.

In particular embodiments, when the proximity sensor module is nested in its socket on a communications device of the invention, it makes electrical connection with the batteries of the device, and its own battery is thereby recharged.

In certain embodiments of the invention, the proximity sensor module provides a coded signal to the communications device, without which the communications device will not operate. The ability of the device to recognize and respond to the specific coded signal may be provided entirely by the operating system software, but preferably relies on keys embedded in firmware or hardware. This activation signal may be delivered via electrical contacts in the module's socket, or it may be delivered wirelessly. In these embodiments, the proximity sensor module acts as a key, and a lost or stolen communications device of the present invention cannot be operated in the absence of this key. Related technology is known in connection with wireless automobile entry and ignition systems, as taught in U.S. Pat. Nos. 5,818,330 and 6,580,181 (both of which are incorporated herein by reference in their entireties), and in the numerous references cited therein, and can be readily adapted to the present invention by those of skill in the art.

We claim:

1. A mobile communication device comprising a primary display screen mounted in a primary housing, a first auxiliary display screen mounted in a first auxiliary housing, and a second auxiliary display screen mounted in a second auxiliary housing, wherein:
   (a) the first and second auxiliary housings are rotatably attached to the primary housing by one or more pivot means;
   (b) the first and second auxiliary housings are rotatable in a plane substantially parallel to the primary screen, so that the screens remain substantially parallel when the auxiliary housings are rotated;
   (c) the device has a closed state wherein the auxiliary screens are not visible, and at least one open state wherein at least one auxiliary screen is visible; and
   (d) the first and second auxiliary screens rotate in opposite directions when transitioning to one or more of the open states.

2. The mobile communication device of claim 1, wherein the first auxiliary housing is rotatably attached to the primary housing by a first pivot means, and the second auxiliary housing is attached to the primary housing by a second pivot means.

3. The mobile communication device of claim 2, wherein the rotation of the first and second auxiliary housings is driven by a motor.

4. The mobile communication device of claim 1, wherein the device has the general shape of a prolate hemi-ellipsoid and has a volume ranging from about 100 to about 300 cm$^3$.

5. The mobile communication device of claim 1, wherein the first and second pivot means are spring-loaded so as to bias the housings toward the open state.

6. The mobile communication device of claim 1, wherein the rotation of the auxiliary housings about the first and second pivot means is motor-driven.

7. The mobile communication device of claim 1, further comprising at least three batteries.

8. The mobile communication device of claim 7, wherein at least one auxiliary housing contains at least one battery.

9. The mobile communications device of claim 8, wherein at least one auxiliary housing is separable from the primary housing, and wherein the separated auxiliary housing is capable of wireless communication with at least one other housing.

10. The mobile communication device of claim 7, wherein one battery is a reserve battery, further comprising a power management system programmed to detect the power needs of the device, and programmed to draw power from the reserve battery only when necessary to meet the detected need.

11. The mobile communication device of claim 1, further comprising a power management system programmed to detect whether an auxiliary housing has been deployed, wherein said system is configured to provide power to the electronics serving said housing only if deployment is detected.

12. The mobile communication device of claim 1, further comprising at least two subscriber identification means.

13. The mobile communication device of claim 12, wherein at least two subscriber identification means are each configured to communicate with a different service provider.

14. The mobile communication device of claim 13, wherein each subscriber identification means is located in a separate housing.

15. The mobile communication device of claim 12, wherein each subscriber identification means is located in a separate housing.

16. The mobile communication device of claim 15, wherein each subscriber identification means is operatively connected to a microprocessor located in the same housing as the subscriber identification means.

17. The mobile communication device of claim 16, wherein each microprocessor is operatively connected to the display screen mounted in the housing that contains the microprocessor.

18. The mobile communication device of claim 16, further comprising a power management system programmed to detect whether an auxiliary housing has been deployed, wherein said system is configured to provide power to the electronics serving said housing only if deployment is detected.

19. The mobile communication device of claim 1, further comprising a power management system programmed to hold in reserve an emergency charge sufficient to power the device for a pre-defined limited period, wherein the emergency charge is released to the device only when the user engages a dedicated panic button or dials a pre-defined emergency number.

20. The mobile communication device of claim 1, wherein the device is configured to communicate at least intermittently with a proximity sensor regardless of the on or off status of the device.

* * * * *